(12) United States Patent
Ozawa et al.

(10) Patent No.: US 8,960,344 B2
(45) Date of Patent: Feb. 24, 2015

(54) FUEL CELL VEHICLE

(75) Inventors: Naoki Ozawa, Shizuoka-ken (JP); Toru Eguchi, Shizuoka-ken (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 0 days.

(21) Appl. No.: 14/112,192

(22) PCT Filed: Apr. 16, 2012

(86) PCT No.: PCT/JP2012/060226
§ 371 (c)(1),
(2), (4) Date: Oct. 16, 2013

(87) PCT Pub. No.: WO2012/150674
PCT Pub. Date: Nov. 8, 2012

(65) Prior Publication Data
US 2014/0224562 A1    Aug. 14, 2014

(30) Foreign Application Priority Data
May 2, 2011    (JP) .................. 2011-102815

(51) Int. Cl.
*B60K 1/04*    (2006.01)
*B60K 15/01*    (2006.01)
(Continued)

(52) U.S. Cl.
CPC ................. *B60K 1/04* (2013.01); *B60K 15/013* (2013.01); *B60K 15/03006* (2013.01);
(Continued)

(58) Field of Classification Search
CPC .............. B60K 1/04; B60K 2001/005; B60K 2001/0416; B60K 2001/0438; B60K 15/00; B60K 15/07; B60K 15/03006; B60K 15/063; B60K 2015/0634; B60K 2015/0638; B60K 11/06; H01M 8/2465; H01M 8/04089; B60M 8/040829; B60M 8/04201; B60M 8/04007; B60M 8/04014; B60M 8/04067

USPC ............ 180/68.5, 65.31, 68.1, 312; 429/434, 429/439, 407, 455, 456, 458, 459, 462, 512, 429/513, 515; 903/908
See application file for complete search history.

(56) References Cited

U.S. PATENT DOCUMENTS 4,508,793 A * 4/1985 Kumata et al. ................. 429/439
5,354,625 A * 10/1994 Bentz et al. .................... 429/407
(Continued)

FOREIGN PATENT DOCUMENTS

EP    1550571 A1 * 7/2005    ............... B60K 8/00
JP    2000-238541 A    9/2000
(Continued)

OTHER PUBLICATIONS

International Search Report and Written Opinion of the International Searching Authority dated Jul. 10, 2012 for corresponding Application No. PCT/JP2012/060226.

*Primary Examiner* — J. Allen Shriver, II
*Assistant Examiner* — Steve Clemmons
(74) *Attorney, Agent, or Firm* — Alston & Bird LLP

(57) ABSTRACT

An object of the present invention is to efficiently mount a fuel cell system below a floor of a vehicle rear portion and to protect the fuel cell system when a forward impact force acts on a vehicle rear portion. To achieve this, a fuel cell vehicle in which a fuel cell system includes a gas tank is configured to store a fuel gas and a fuel cell unit formed by integrating a fuel cell stack, an intake duct, and an exhaust duct, the gas tank is disposed in a space below a rear floor connected to a front floor via a vertical wall portion and adjacent to the vertical wall portion, and the fuel cell unit is disposed behind the gas tank. In the fuel cell vehicle, an axle beam extending in a vehicle width direction and connecting left and right rear wheels to each other is disposed behind the gas tank, the fuel cell unit is disposed between the axle beam and a rear bumper, and vertical walls of front and rear portions of the fuel cell stack are covered with at least one of an upstream portion of the intake duct and a downstream portion of the exhaust duct.

3 Claims, 3 Drawing Sheets

(51) Int. Cl.
*B60K 15/03* (2006.01)
*B60K 15/063* (2006.01)

(52) U.S. Cl.
CPC ...... *B60K 15/063* (2013.01); *B60K 2001/0416* (2013.01); *B60K 2001/0438* (2013.01); *Y02E 60/50* (2013.01); *B60K 2015/0634* (2013.01)
USPC .......... 180/68.1; 180/68.5; 429/439; 429/407

(56) References Cited

U.S. PATENT DOCUMENTS

| | | | | |
|---|---|---|---|---|
| 5,541,015 | A * | 7/1996 | Tajima et al. | 429/439 |
| 6,068,944 | A * | 5/2000 | Witzigreuter | 429/407 |
| 6,582,843 | B1 * | 6/2003 | Heuser et al. | 429/412 |
| 7,255,157 | B2 * | 8/2007 | Richardson | 165/163 |
| 7,770,679 | B2 * | 8/2010 | Takaku et al. | 180/68.5 |
| 8,083,263 | B2 * | 12/2011 | Yamanami et al. | 280/830 |
| 2003/0116374 | A1 * | 6/2003 | Chernoff et al. | 180/291 |
| 2005/0008912 | A1 * | 1/2005 | Yang et al. | 429/26 |
| 2005/0014047 | A1 * | 1/2005 | Hatsugai et al. | 429/26 |
| 2005/0255340 | A1 * | 11/2005 | Watanabe et al. | 429/12 |
| 2008/0047767 | A1 * | 2/2008 | Tsuchiya | 180/68.5 |
| 2008/0193812 | A1 * | 8/2008 | Murata et al. | 429/24 |
| 2009/0090575 | A1 * | 4/2009 | Nagasaka | 180/68.5 |
| 2009/0239106 | A1 * | 9/2009 | Whitehead et al. | 429/13 |
| 2009/0309349 | A1 * | 12/2009 | Yamanami et al. | 280/830 |
| 2010/0051625 | A1 * | 3/2010 | Dandalides et al. | 220/562 |
| 2010/0119916 | A1 * | 5/2010 | Yanagisawa | 429/34 |
| 2010/0252353 | A1 * | 10/2010 | Tsubokawa | 180/314 |
| 2011/0148089 | A1 * | 6/2011 | Klimek et al. | 280/830 |

FOREIGN PATENT DOCUMENTS

| | | |
|---|---|---|
| JP | 2004-42828 A | 2/2004 |
| JP | 2006-315578 A | 11/2006 |
| JP | 2010-89531 A | 4/2010 |
| JP | 2009-255774 A | 11/2011 |

* cited by examiner

FUEL CELL VEHICLE

CROSS-REFERENCE TO RELATED APPLICATIONS

This application is a national stage application filed under 35 U.S.C. 371 of International Application No. PCT/JP2012/060226, filed Apr. 16, 2012, which claims priority from Japanese Patent Application No. 2011-102815, filed May 2, 2011, each of which is incorporated by reference herein in its entirety.

TECHNICAL FIELD

The present invention relates to a fuel cell vehicle and, in particular, relates to a fuel cell vehicle equipped with a fuel cell stack to which an intake duct and an exhaust duct are attached.

BACKGROUND ART

A fuel cell system includes a hydrogen gas supplying device, an air supplying device, and a cooling device.

Conventionally, many fuel cell systems for vehicles have been a water-cooled fuel cell system in which air is compressed with a compressor and then supplied to a fuel cell stack to improve output density of the fuel cell stack and in which the fuel cell stack is cooled with cooling water.

CITATION LIST

Patent Literatures

[PTL 1]
Japanese Patent Laid-Open No. 2004-42828

SUMMARY OF INVENTION

Technical Problems

Patent Literature 1 listed above describes the following structure. In a fuel cell vehicle equipped with a water-cooled fuel cell system, a fuel cell stack and accessory devices thereof are mounted on a ladder-shaped sub frame and these components are integrally mounted in a rear portion of a vehicle body.

Such a structure improves the mountability of the fuel cell system on the vehicle and can protect the fuel cell system by using the sub frame when a forward impact force acts on a rear portion of the vehicle.

However, since the space in a vehicle lower portion is reduced by a size corresponding to the sub frame, this structure has a drawback that the fuel cell stack cannot be mounted in the lower portion of the vehicle and a cabin space of the vehicle is reduced due to the fuel cell stack.

Among the fuel cell systems, there is an air-cooled fuel cell system which uses air as a reaction gas and also as a cooling medium.

Since the air-cooled fuel cell system can perform air supply and cooling of the fuel cell stack by using an intake duct, an exhaust duct, and a fan, the structures of accessory devices are simple compared to those of the water-cooled fuel cell system.

Accordingly, it is easy to mount the air-cooled fuel cell system in the lower portion of the vehicle.

However, the air-cooled fuel cell system has a drawback that a structure which protects the fuel cell system when a forward impact force acts on the rear portion of the vehicle needs to be added to the system.

An object of the present invention is to efficiently mount a fuel cell system below a floor of a vehicle rear portion and to protect the fuel cell system with a simple structure when a forward impact force acts on the rear portion of the vehicle.

Solution to Problem

In order to solve the above problem, the present invention provides a fuel cell vehicle in which a fuel cell system includes a gas tank configured to store a fuel gas and a fuel cell unit formed by integrating a fuel cell stack, an intake duct, and an exhaust duct, the gas tank is disposed in a space below a rear floor connected to a front floor via a vertical wall portion and adjacent to the vertical wall portion, and the fuel cell unit is disposed behind the gas tank, wherein an axle beam extending in a vehicle width direction and connecting left and right rear wheels to each other is disposed behind the gas tank, the fuel cell unit is disposed between the axle beam and a rear bumper, and vertical walls of front and rear portions of the fuel cell stack are covered with at least one of an upstream portion of the intake duct and a downstream portion of the exhaust duct.

Advantageous Effects of Invention

In the present invention described above in detail, since the axle beam extending in the vehicle width direction and connecting the left and right rear wheels to each other is disposed behind the gas tank and the fuel cell unit is disposed between the axle beam and the rear bumper, the fuel cell system can be efficiently mounted below the floor of a vehicle rear portion.

Moreover, when a forward impact force acts on the rear portion of the vehicle, movement of the fuel cell unit toward a front side of the vehicle is restricted by the axle beam and the fuel cell unit is thereby prevented from hitting the gas tank.

Furthermore, the vertical walls of the front and rear portions of the fuel cell stack are covered with at least one of the upstream portion of the intake duct and the downstream portion of the exhaust duct.

Thus, when the fuel cell unit moves toward the front side of the vehicle due to an impact force and is interposed between the rear bumper and the axle beam, the intake duct or the exhaust duct deforms to absorb the impact force and the fuel cell stack can be thereby protected.

Accordingly, in the present invention, it is possible to efficiently mount the fuel cell system below the floor of the vehicle rear portion and to protect both of the gas tank and the fuel cell stack when a forward impact force acts on the rear portion of the vehicle.

Moreover, left and right sides of the fuel cell unit are covered with left and right portions of the axle beam and the left and right rear tires. Accordingly, when an impact force in a left-right direction acts on a left portion or a right portion of the vehicle, the fuel cell stack can be protected from the impact force with a simple structure.

DESCRIPTION OF EMBODIMENTS

An embodiment of the present invention is described below in detail based on the drawings.

[Embodiment]

Figure 1:
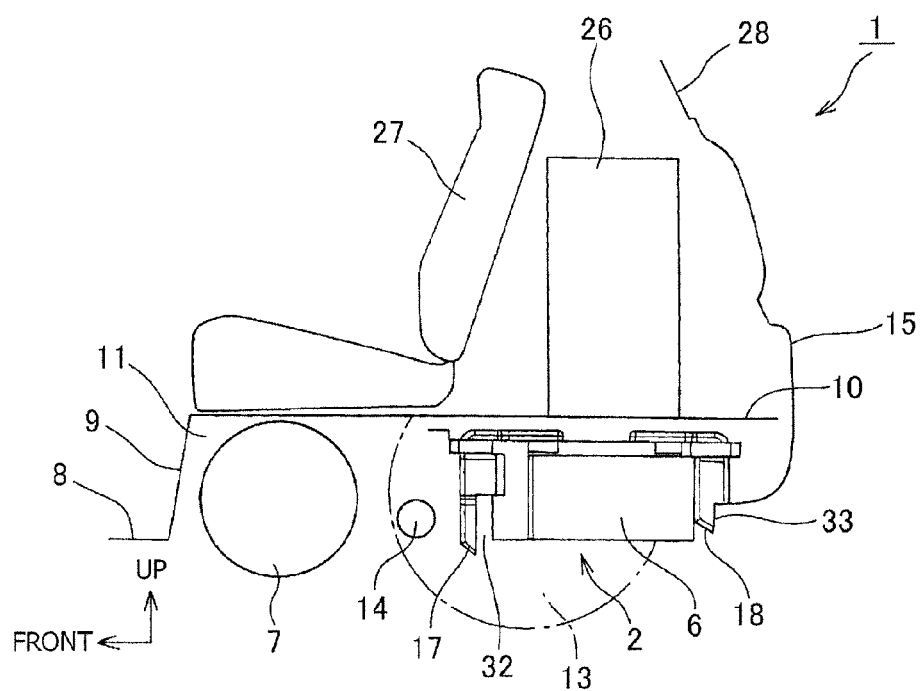
FIG. 1 is a side view of a fuel cell vehicle rear portion. (Embodiment)
Figure 2:
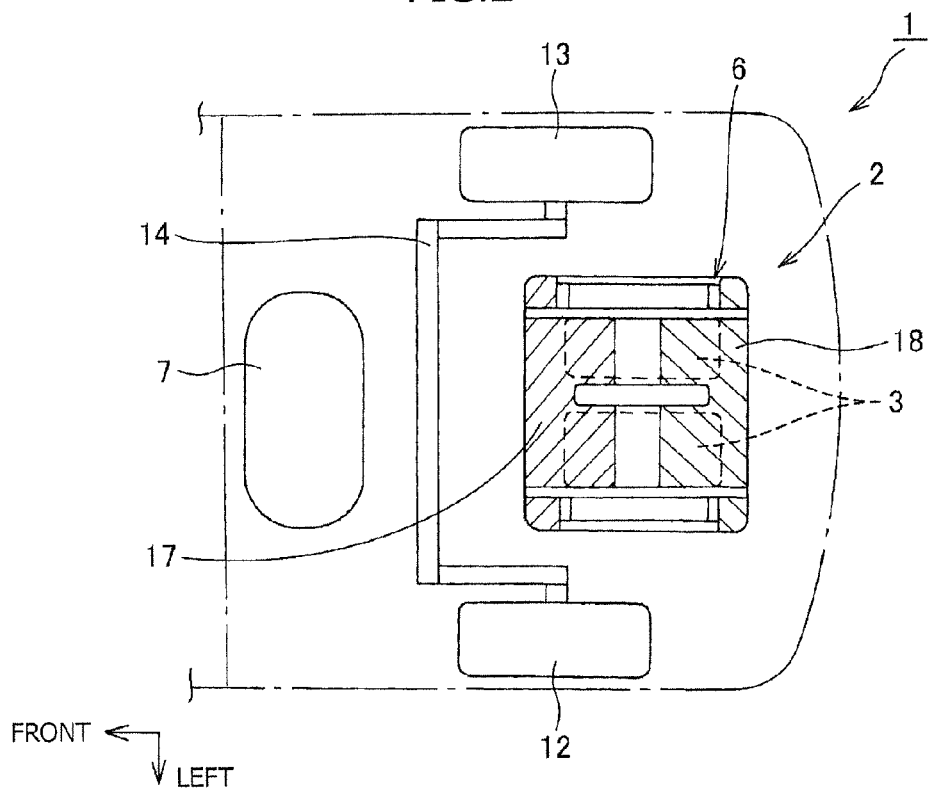
FIG. 2 is a plan view of the fuel cell vehicle rear portion. (Embodiment)

FIGS. 1 to 6 illustrate an embodiment of the present invention. In FIGS. 1 and 2, reference numeral 1 denotes a fuel cell vehicle which is a four-wheel vehicle.

The fuel cell vehicle 1 includes an air-cooled fuel cell system 2 which uses air as a reaction gas and as a cooling medium.

As shown in FIGS. 1 to 4, the fuel cell system 2 includes: a fuel cell unit 6 formed by integrating a fuel cell stack 3, an intake duct 4, and an exhaust duct 5; and a gas tank 7 configured to store a fuel gas.

In this case, the gas tank 7 is disposed in a space 11 which is below a rear floor 10 connected to a front floor 8 via a vertical wall portion 9 and which is adjacent to the vertical wall portion 9, and the fuel cell unit 6 is disposed behind the gas tank 7.

Moreover, the fuel cell vehicle 1 has the following configuration. An axle beam 14 extending in a vehicle width direction and connecting left and right rear wheels 12, 13 to each other is disposed behind the gas tank 7, the fuel cell unit 6 is disposed between the axle beam 14 and a rear bumper 15, and vertical walls 3a, 3b of front and rear portions of the fuel cell stack 3 are covered with at least one of an upstream portion of the intake duct 4 and a downstream portion of the exhaust duct 5.

Since the axle beam 14 extending in the vehicle width direction and connecting the left and right rear wheels to each other is disposed behind the gas tank 7 and the fuel cell unit 6 is disposed between the axle beam 14 and the rear bumper 15, the fuel cell system 2 is efficiently mounted below the rear floor 10 which is a floor of a vehicle rear portion.

Moreover, when a forward impact force acts on the rear portion of the vehicle, movement of the fuel cell unit 6 toward a front side of the vehicle is restricted by the axle beam 14 and the fuel cell unit 6 is thereby prevented from hitting the gas tank 7.

The vertical walls 3a, 3b of the front and rear portions of the fuel cell stack 3 are covered with at least one of the upstream portion of the intake duct 4 and the downstream portion of the exhaust duct 5. Thus, when the fuel cell unit 6 moves toward the front side of the vehicle due to an impact force and is interposed between the rear bumper 15 and the axle beam 14, the intake duct 4 or the exhaust duct 5 deforms to absorb the impact force and the fuel cell stack 3 can be thereby protected.

Accordingly, in the present invention, it is possible to efficiently mount the fuel cell system 2 below the rear floor 10 which is the floor of the vehicle rear portion and to protect both of the gas tank 7 and the fuel cell stack 3 when a forward impact force acts on the rear portion of the fuel cell vehicle 1.

Moreover, left and right sides of the fuel cell unit 6 are covered with left and right portions of the axle beam 14 and the left and right rear tires 12, 13. Accordingly, when an impact force in a left-right direction acts on a left portion or a right portion of the vehicle, the fuel cell stack 3 can be protected from the impact force.

To be more specific, as shown in FIGS. 3 to 6, the fuel cell unit 6 includes a frame 16 to which the fuel cell stack 3 is fixed, the intake duct 4 which is attached to left and right sides of a lower portion of the fuel cell stack 3, and the exhaust duct 5 which covers an upper portion and the front and rear portions of the fuel cell stack 3.

In this case, the exhaust duct 5 is formed of a front exhaust duct 17 and a rear exhaust duct 18. The front exhaust duct 17 is formed of a front upper cover 19 covering a front upper portion of the fuel cell stack 3 and a front cover 20 covering a front side of the fuel cell stack 3. The rear exhaust duct 18 is formed of a rear upper cover 21 covering a rear upper portion of the fuel cell stack 3 and a rear cover 22 covering a rear side of the fuel cell stack 3.

Figure 6:
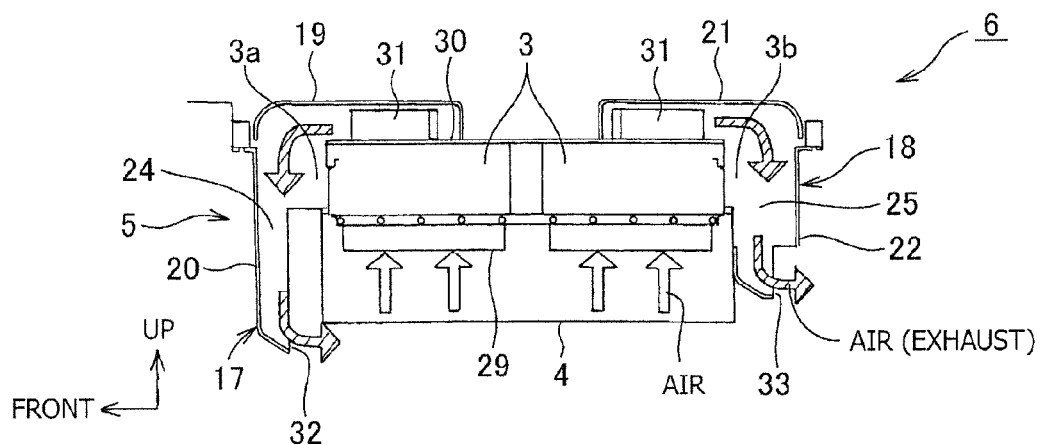
FIG. 6 is a vertical cross-sectional view of the fuel cell unit taken along the A-A line of FIG. 5. (Embodiment)

As shown in FIG. 6, the vertical walls 3a, 3b of the front and rear portions of the fuel cell stack 3 are covered with the downstream portion of the exhaust duct 5, for example.

Moreover, as shown in FIG. 6, in the downstream portion of the exhaust duct 5 covering the vertical walls 3a, 3b of the front and rear portions of the fuel cell stack 3, passages 24, 25 thereof extend in the vehicle up-down direction.

As a result, the passage 24 on the front side which is located in the downstream portion at the front cover 20 of the exhaust duct 5 and the passage 25 on the rear side which is located in the downstream portion at the rear cover 22 of the exhaust duct 5 are arranged in such a direction that the passages deform easily when an impact force in the vehicle front-rear direction acts. Accordingly, absorption of an impact force acting in the vehicle front-rear direction can be improved.

Furthermore, a rechargeable secondary battery (also referred to as "battery") 26 is disposed above the fuel cell unit 6.

Specifically, as shown in FIG. 1, the rechargeable secondary battery 26 is disposed on the rear floor 10, between a rear seat 27 of the fuel cell vehicle 1 and a group of the rear bumper 15 and a back door 28 located above the rear bumper 15, so that the vehicle can travel even when power generation of the fuel cell stack 3 is not performed.

The secondary battery 26 has higher stiffness than the fuel cell unit 6 and the gas tank 7 and has a structure which is less crushable.

Accordingly, the secondary battery 26 is disposed above the fuel cell unit 6 to achieve a structure in which the secondary battery 26 does not hit the fuel cell unit 6 or the gas tank 7 even when a forward impact force acts on the rear portion of the vehicle and the secondary battery 26 moves toward the front side of the vehicle.

The gas tank 7 and the fuel cell unit 6 can be thereby protected from a collision with the secondary battery 26.

Figure 3:
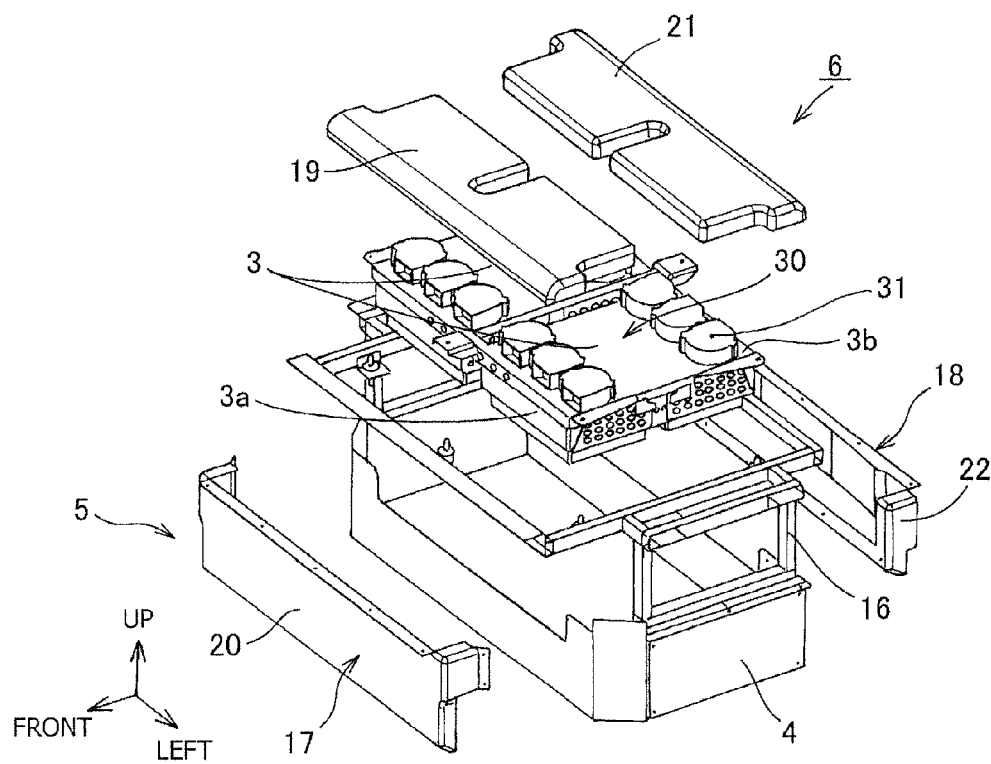
FIG. 3 is an exploded perspective view of a fuel cell unit. (Embodiment)
Figure 4:
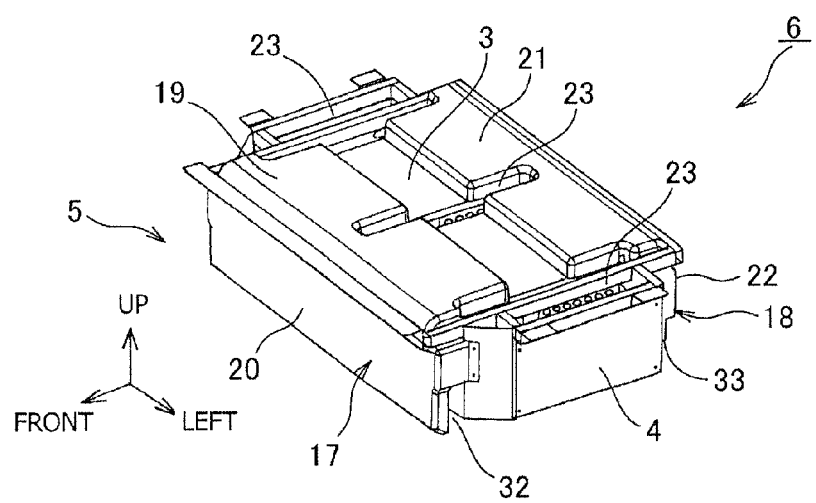
FIG. 4 is a perspective view of the fuel cell unit. (Embodiment)
Figure 5:
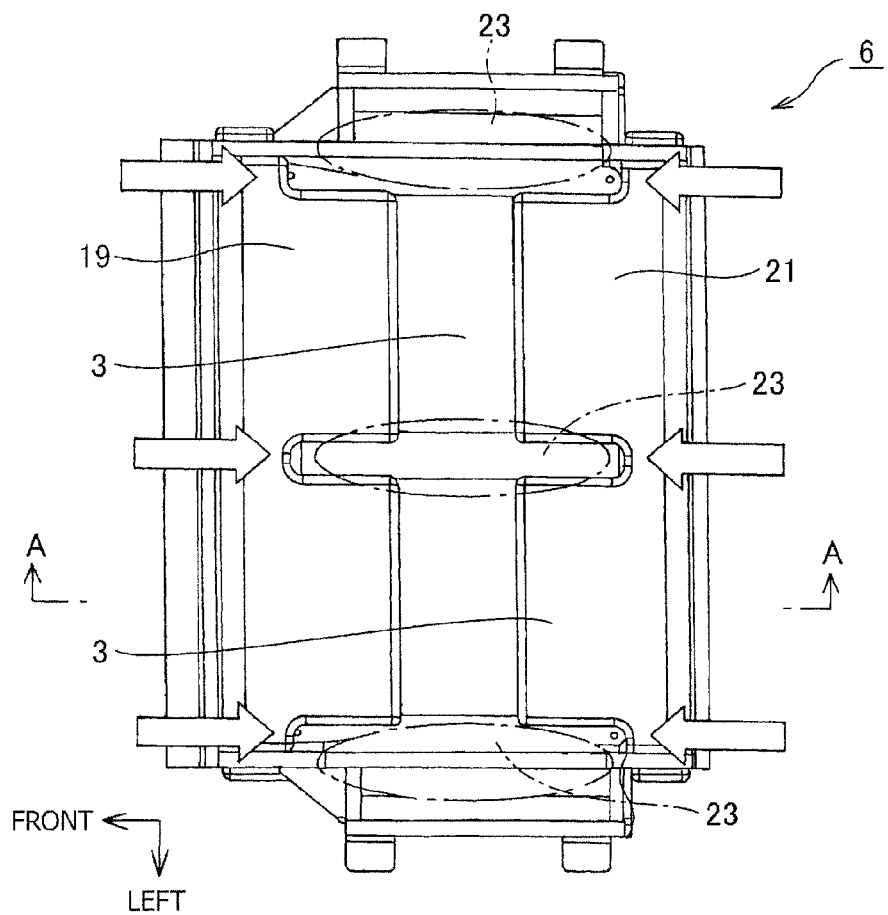
FIG. 5 is a plan view of the fuel cell unit. (Embodiment)

In addition, the fuel cell stack 3 includes, as shown in FIG. 6, an air introduction surface 29 from which air is introduced to the inside and, as shown in FIGS. 3 and 6, an air discharge surface 30 from which air is discharged to the outside respectively on surfaces on opposite sides.

In this case, the fuel cell stack 3 is disposed below the rear floor 10 of the fuel cell vehicle 1 with the air discharge surface 30 facing upward and a plurality of fans 31 configured to draw out air are disposed on the air discharge surface 30 side.

Moreover, the fuel cell stack 3 is fixed to the frame-shaped frame 16 surrounding the front, rear, left, and right sides of the fuel cell stack 3, and the intake duct 4 and the exhaust duct 5 are attached to an outer portion of the frame 16.

In this case, a passage (not shown) of the intake duct 4 extends along the air introduction surface 29 and vertical walls (not shown) of left and right end portions of the fuel cell stack 3, and an air introduction port 23 is open upward in each of left and right end portions and a center portion of the passage.

Furthermore, regarding the exhaust duct 5, the passage 24 on the front side and the passage 25 on the rear side extend along the air discharge surface 30 and the vertical walls 3a, 3b of the front and rear portions of the fuel cell stack 3, and a pair of air discharge ports 32, 33 are open respectively in a front end portion of the passage 24 and a rear end portion of the passage 25.

In this case, air flowing from an upper side to a lower side in front of the intake duct 4 as shown by the hatched arrows of FIG. 6 is discharged from the air discharge port 32 on the front side, toward the rear side of the vehicle along a lower surface of the intake duct 4.

Moreover, air flowing from an upper side to a lower side behind the intake duct 4 as shown by the hatched arrows of FIG. 6 is discharged from the air discharge port 33 on the rear side, toward the rear side of the vehicle.

Although the vertical walls 3a, 3b of the front and rear portions of the fuel cell stack 3 are covered with the downstream portion of the exhaust duct 5 in the embodiment of the present invention, the configuration may be such that the structures of the intake duct 4 and the exhaust duct 5 are interchanged and the vertical walls of the front and rear portions of the fuel cell stack 3 are covered with the upstream portion of the intake duct 4.

REFERENCE SIGNS LIST

1 Fuel cell vehicle
2 Fuel cell system
3 Fuel cell stack
3a, 3b Vertical wall
4 Intake duct
5 Exhaust duct
6 Fuel cell unit
7 Gas tank
8 Front floor
9 Vertical wall portion
10 Rear floor
11 Space
12, 13 Left and right rear wheels
14 Axle beam
15 Rear bumper
16 Frame
17 Front exhaust duct
18 Rear exhaust duct
19 Front upper cover
20 Front cover
21 Rear upper cover
22 Rear cover
23 Air introduction port
24, 25 Passage
26 Secondary battery (also referred to as "battery")
27 Rear seat
28 Back door
29 Air introduction surface
30 Air discharge surface
31 Fan
32, 33 Air discharge port

The invention claimed is:

1. A fuel cell vehicle in which a fuel cell system includes a gas tank configured to store a fuel gas and a fuel cell unit formed by integrating a fuel cell stack, an intake duct, and an exhaust duct, the gas tank is disposed in a space below a rear floor connected to a front floor via a vertical wall portion and adjacent to the vertical wall portion, and the fuel cell unit is disposed behind the gas tank, wherein
an axle beam extending in a vehicle width direction and connecting left and right rear wheels to each other is disposed behind the gas tank,
the fuel cell unit is disposed between the axle beam and a rear bumper, and vertical walls of front and rear portions of the fuel cell stack are covered with at least one of an upstream portion of the intake duct and a downstream portion of the exhaust duct.

2. The fuel cell vehicle according to claim 1, wherein the at least one of the upstream portion of the intake duct and the downstream portion of the exhaust duct, which covers the vertical walls of the front and rear portions of the fuel cell stack, has a passage extending in a vehicle up-down direction.

3. The fuel cell vehicle according to claim 1, wherein a rechargeable secondary battery is disposed above the fuel cell unit.

* * * * *